(12) United States Patent
Morrissett

(10) Patent No.: US 6,460,007 B1
(45) Date of Patent: Oct. 1, 2002

(54) METHOD AND APPARATUS FOR DETERMINATION OF RESISTANCE SPOT WELDED FLANGE WIDTH

(75) Inventor: Thomas Morrissett, Troy, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/528,320

(22) Filed: Mar. 20, 2000

(51) Int. Cl.[7] .............................. B23K 37/02; B23K 9/32
(52) U.S. Cl. ................. 702/150; 219/86.41; 219/78.01; 219/50
(58) Field of Search .......................... 702/150; 219/50, 219/55, 78.01, 61.5, 86.41, 86.8; 700/145, 174, 175

(56) References Cited

U.S. PATENT DOCUMENTS

| | | | | |
|---|---|---|---|---|
| 4,525,618 A | * | 6/1985 | Beneteau | 219/116 |
| 4,795,875 A | * | 1/1989 | Urech | 219/119 |
| 4,803,325 A | * | 2/1989 | Frei et al. | 219/116 |
| 4,902,869 A | * | 2/1990 | Wald | 219/86.32 |
| 4,929,812 A | * | 5/1990 | Ivannikov et al. | 219/137.2 |
| 5,104,032 A | | 4/1992 | Spies et al. | |
| 5,383,592 A | | 1/1995 | Fussnegger et al. | |
| 5,632,912 A | * | 5/1997 | Cecil | 219/110 |
| 5,808,266 A | * | 9/1998 | Cecil | 219/110 |
| 5,897,796 A | * | 4/1999 | Forrest | 219/121.64 |
| 6,064,028 A | * | 5/2000 | Schmid-Doernte | 219/86.41 |
| 6,075,219 A | * | 6/2000 | Furukawa et al. | 219/119 |
| 6,186,011 B1 | * | 2/2001 | Wung et al. | 73/850 |
| 6,218,637 B1 | * | 4/2001 | Morrissett | 219/86.7 |

OTHER PUBLICATIONS

Shriver et al., "Control of Resistance Spot Welding", IEEE, Jun. 1999.*

* cited by examiner

Primary Examiner—Patrick Assouad
(74) Attorney, Agent, or Firm—Thomas A. Jurecko

(57) ABSTRACT

A data processing system is provided for determining a minimum flange length for a joint to be welded by resistance spot welding. In particular, the data processing system utilizes data for a preselected weld electrode and a set of joint data representative of a joint to be welded to determine whether a set of corrected tip data or a set of uncorrected tip data is to be used in determining the minimum flange length. A method for calculating the minimum flange length is also provided.

16 Claims, 5 Drawing Sheets

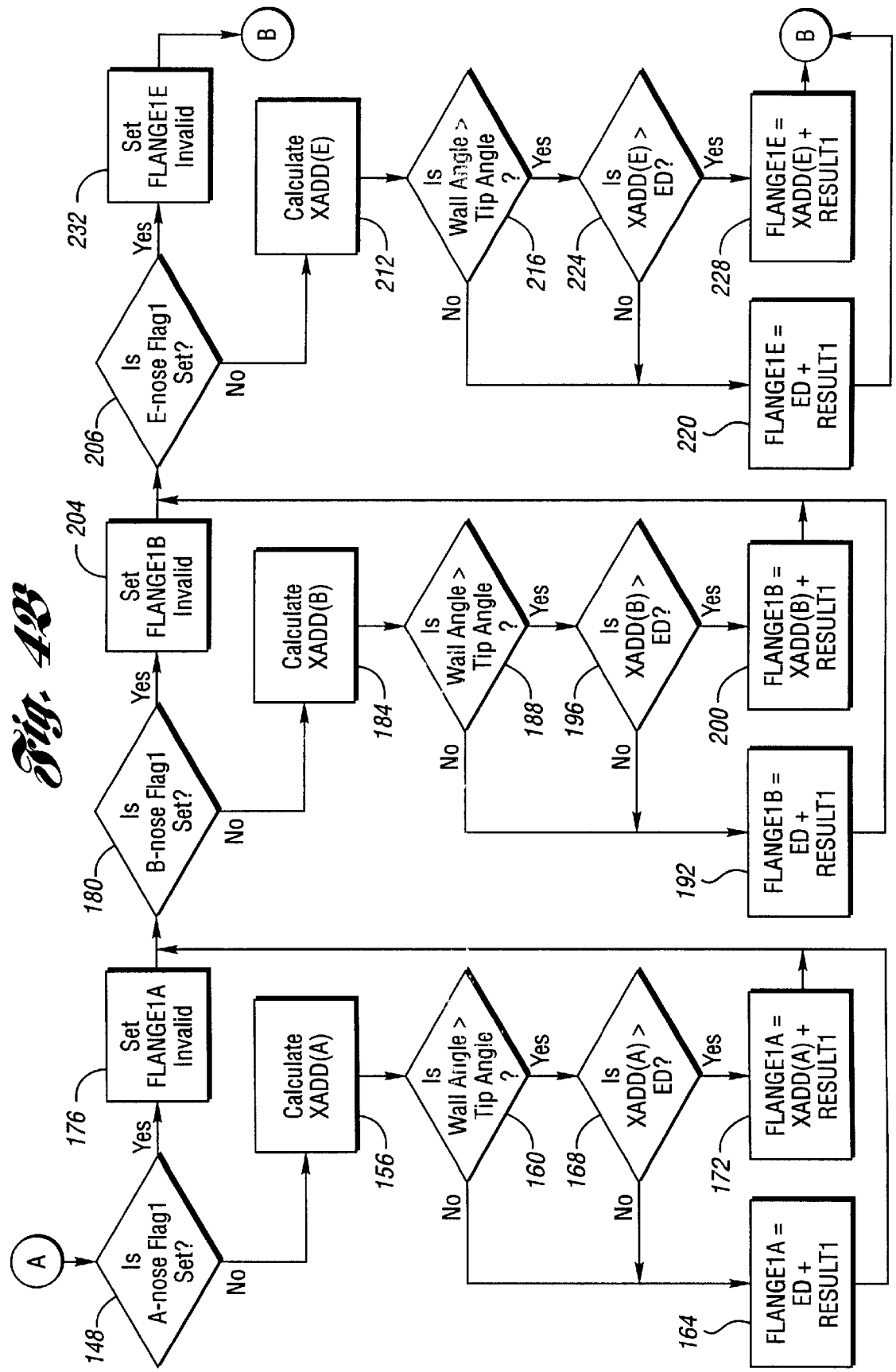

METHOD AND APPARATUS FOR DETERMINATION OF RESISTANCE SPOT WELDED FLANGE WIDTH

BACKGROUND OF THE INVENTION

1. Technical Field

The present invention relates generally to the design of sheet metal fabrications and more particularly to a method for designing a sheet joint which is to be joined by spot welding.

2. Discussion

Small welded flanges for sheet metal joints typically permit a reduction in the weight of a fabrication, improve the appearance of the fabrication and/or aid in the achievement of one or more of specific goals related to an application, such as improved visibility for vehicle occupants. However, the size of such welded flanges is often limited by various manufacturing and processing variables as well as the capabilities of standard equipment (i.e., commercially available weld tools and tips). The manufacturing and processing variables include, for example, wall angles, bend radii, tolerances, electrode shapes, variations in sheet metal thicknesses and electrode wear.

Accordingly, there remains a need in the art for a quick, efficient and accurate method for sizing sheet metal joints in a manner which permits them to be welded together by standard resistance spot welding tools.

SUMMARY OF THE INVENTION

It is one object of the present invention to provide a data processing system for determining a minimum flange length for a resistance welded joint.

It is another object of the present invention to provide a method for sizing the flanges of a sheet metal joint to permit welding of the sheet metal joint with standard equipment.

A data processing system is provided for determining a minimum flange length for a joint to be welded by resistance spot welding. In particular, the data processing system utilizes data for a preselected weld electrode type and a set of joint data representative of a joint to be welded to determine whether a set of corrected tip data or a set of uncorrected tip data is to be used in determining the minimum flange length. A method for calculating the minimum flange length is also provided.

Additional advantages and features of the present invention will become apparent from the subsequent description and the appended claims, taken in conjunction with the accompanying drawings.

BRIEF DESCRIPTION OF THE DRAWINGS

FIGS. 4A through 4D set forth a schematic diagram of the method of the present invention in flowchart form.

DETAILED DESCRIPTION OF THE PREFERRED EMBODIMENT

Figure 1:
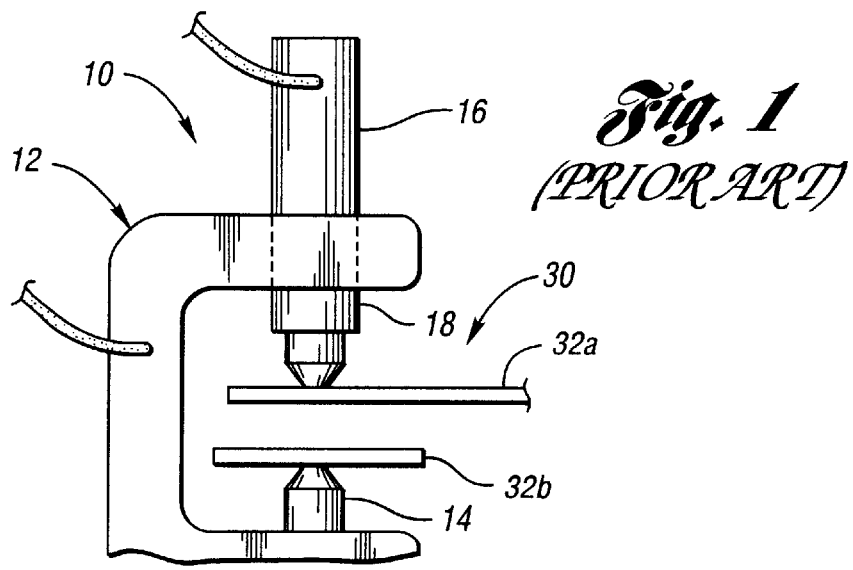
FIG. 1 is a schematic illustration of a device being welded with a conventional resistance spot weld tool.
Figure 2:
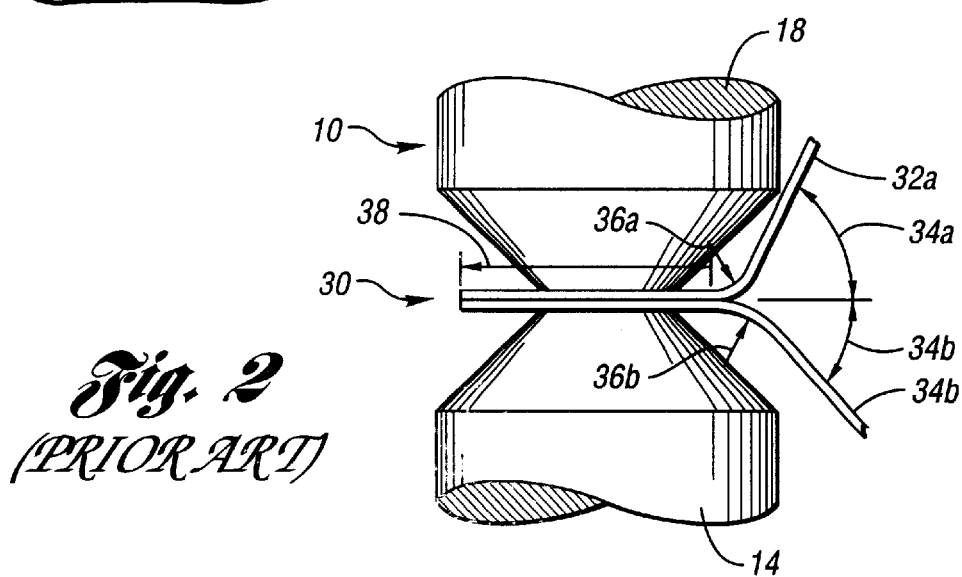
FIG. 2 is an enlarged portion of the weld tool of FIG. 1.

In FIGS. 1 and 2, a conventional weld tool is generally indicated by reference numeral 10. Weld tool 10 is illustrated as having a generally C-shaped structural frame 12, a first electrode or tip 14, a transport mechanism 16 and a second electrode or tip 18. Although a particular type of weld tool is illustrated as a "C" type weld gun, it will be understood that the teachings of the present invention have applicability to other types of weld tools, including but not limited to pinch guns and scissors guns. Mechanically, first electrode 14 is fixedly but removably coupled to frame 12. First electrode 14 is also electrically coupled to frame 12. Transport mechanism 16 is fixedly coupled to frame 12 but electrically isolated therefrom. Second electrode 18 is fixedly but removably coupled to transport mechanism 16 but is electrically isolated therefrom. Transport mechanism 16 includes a pneumatic cylinder or clamp (not specifically shown) which permits second electrode 18 to be moved relative to first electrode 14. As is well known in the art, transport mechanism 16 may alternatively include an electrically or hydraulically operated clamp or cylinder.

Weld tool 10 is operable for resistance spot welding a joint 30 together. Joint 30 is comprised of two or more sheet metal members 32 together. In the particular joint illustrated, sheet metal member 32a has a wall angle 34a with a bend radius 36a, sheet metal member 32b has a wall angle 34b with a bend radius 36b and joint 30 has a flange length 38.

In welding joint 30 together, first electrode 14 is typically positioned so as to abut sheet metal member 32b and transport mechanism 16 is actuated to extend second electrode 18 toward first electrode 14 to exert a clamping force through joint 30. A high current electric charge is then passed through the first and second electrodes 14 and 18 which causes the formation of a resistance spot weld.

Figure 3:
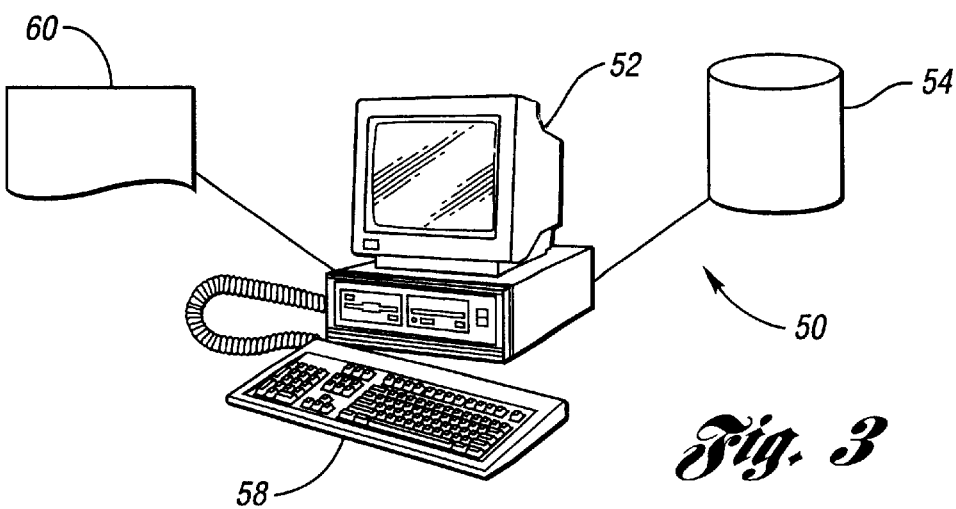
FIG. 3 is a schematic illustration of an apparatus constructed in accordance with the teachings of the present invention.
Figure 4A:
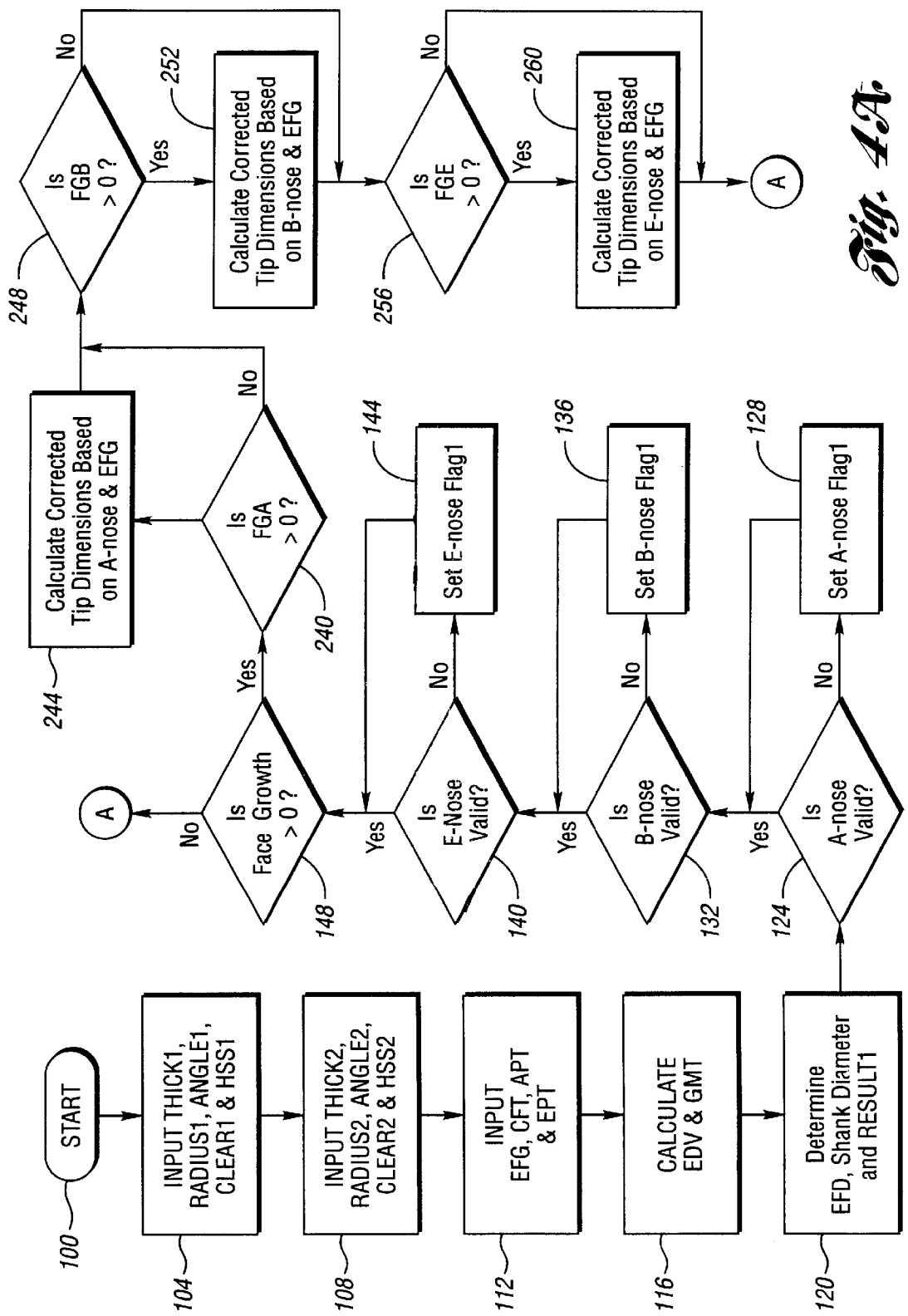
Figure 4C:
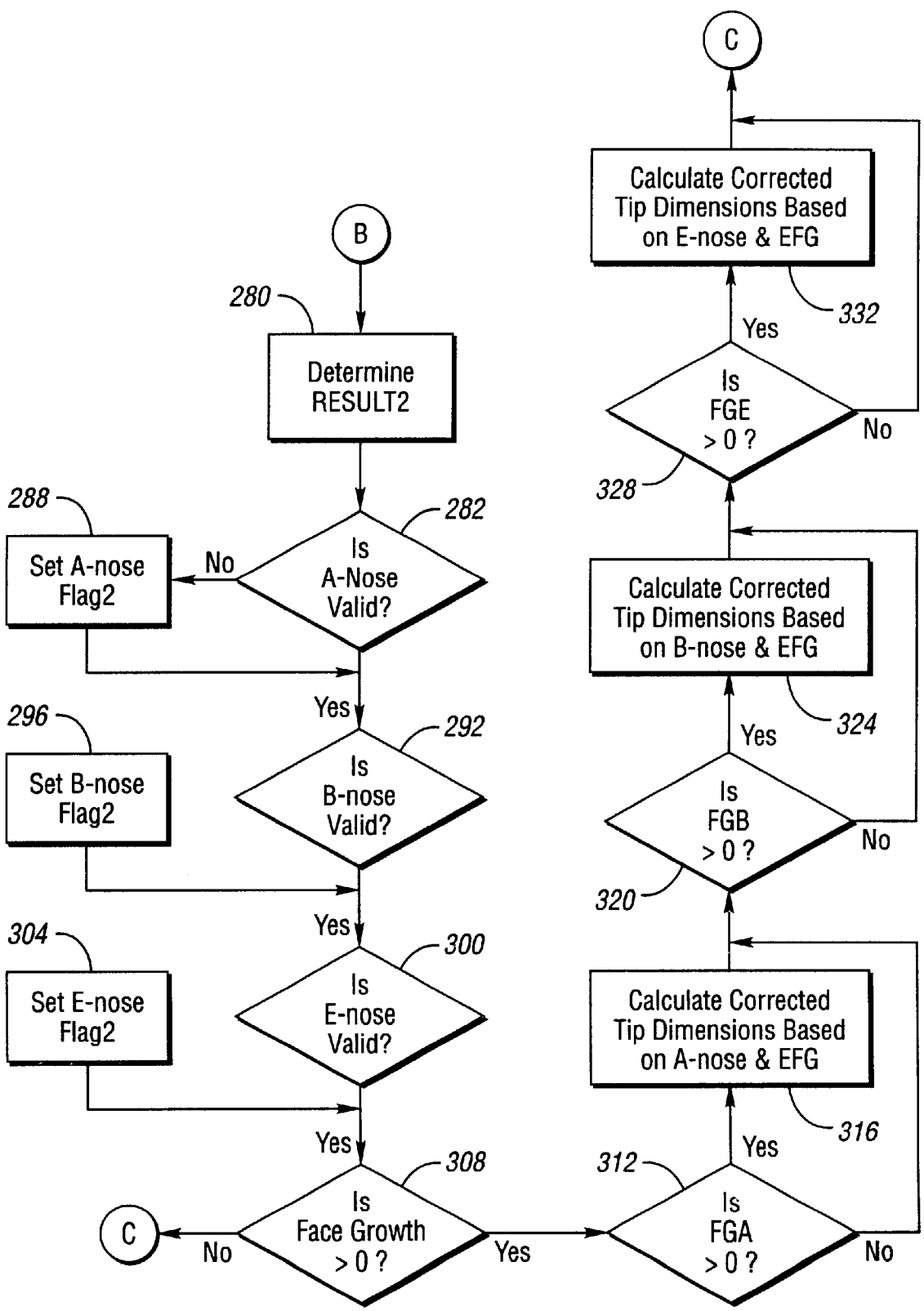
Figure 49:
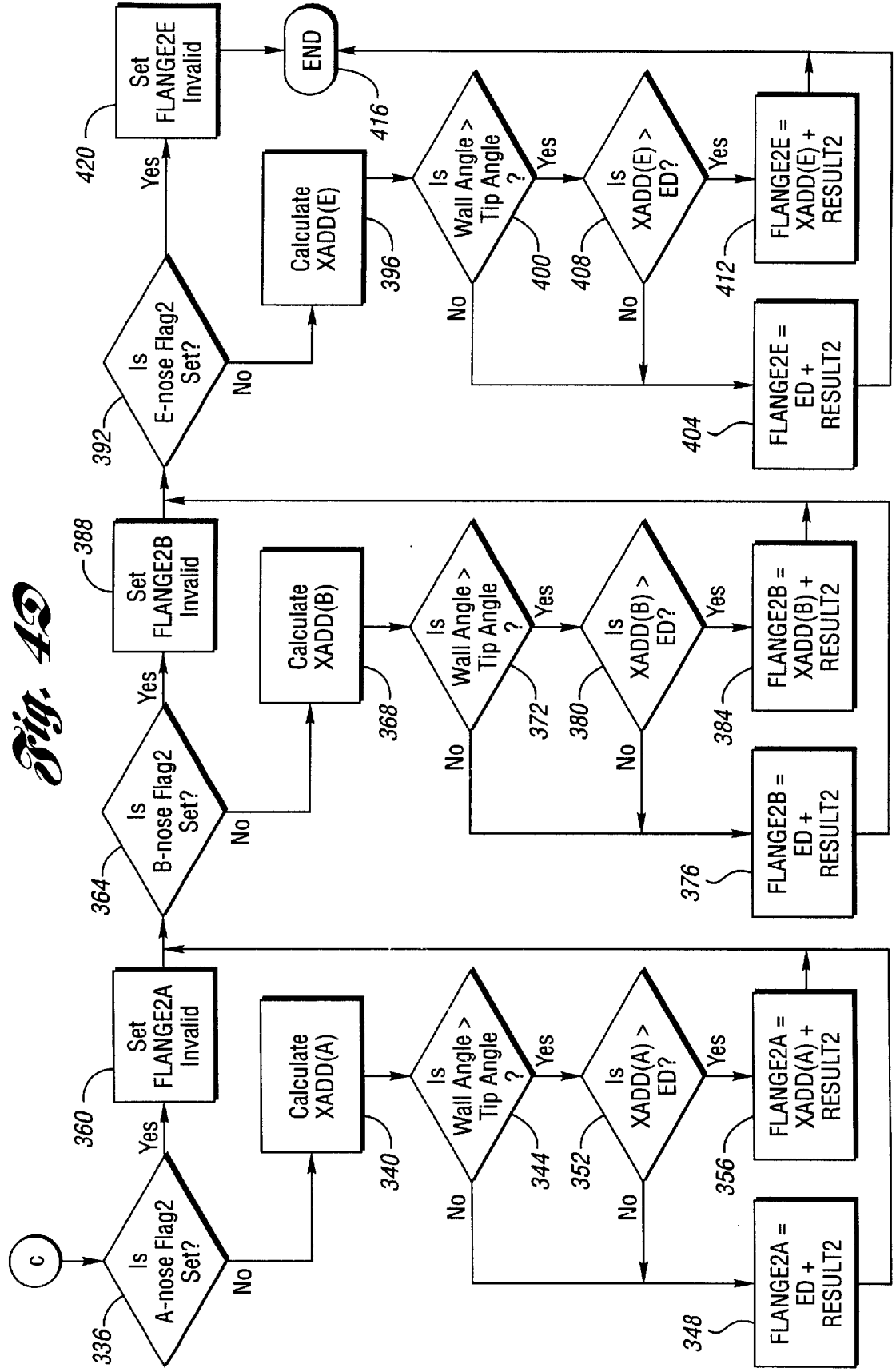

In FIG. 3, a data processing system constructed in accordance with the teachings of the present invention is schematically illustrated. Data processing system 50 is shown to include a computer processor 52 for processing data, a data storage device 54 storing data regarding a plurality of types of resistance weld electrodes, inputting means 58 for inputting a predetermined set of joint data representative of a joint to be welded, and processing means 60 operable for performing the method of the present invention (described in detail, below) to calculate the minimum flange length.

The data stored in data storage 54 device preferably includes the tip geometry (including the tip angle), the shank diameter, the face diameter and the length of a plurality of electrode types, such as A-nose, B-nose and E-nose electrodes. Input means may be a keyboard, for example, which permits entry of the set of joint data. The set of joint data preferably includes a thickness, a bend radius, a wall angle, the electrode face growth, the cut flange tolerance, the assembly positional tolerance, the electrode to wall clearance and the electrode positional tolerance (these terms are described in detail below).

In FIGS. 4A through 4D the method of the present invention is schematically illustrated in flowchart form. The methodology is entered at bubble 100 and progresses to block 104 where the thickness of sheet metal member 32a (THICK1), bend radius 36a (RADIUS1), wall angle 34a (ANGLE1) and the desired clearance between second electrode 18 and sheet metal member 32a (CLEAR1) are input, as well as whether sheet metal member 32a is formed from a high strength steel (HSS1). The methodology proceeds to block 108 where the thickness of sheet metal member 32b (THICK2), bend radius 36b (RADIUS2), wall angle 34b (ANGLE2) and the desired clearance between first electrode 14 and sheet metal member 32b (CLEAR2) are input as well as whether sheet metal member 32b is formed from a high strength steel (HSS2).

The methodology next proceeds to block 112 where the electrode face growth (EFG), the cut flange tolerance (CFT), the assembly positional tolerance (APT) and the electrode positional tolerance (EPT) are input. The EFG represents the amount by which the first and second electrodes 14 and 18 are permitted to grow due to wear. The CFT, APT and EPT represent manufacturing tolerances associated with the flange length 38, the positional relationship of sheet metal members 32a and 32b, and the positional relationship of weld tool 10 to the joint 30. The methodology next proceeds to block 116.

In block 116, the methodology calculates the expulsion dam value (EDV) and the governing metal thickness (GMT). The EDV takes into consideration the molten material which is expelled outward from the first and second electrodes 14 and 18 when the joint 30 is welded. The EDV must be added to the flange length to prevent welding problems. The GMT is simply the thinner of the two sheets being welded together.

The methodology next proceeds to block 120 where the electrode face diameter (EFD) and the shank diameter are determined and a first intermediate result (RESULT1) is calculated. The EFD and shank diameter are determined from tabular data and selected on the basis of the GMT as is known in the art. The first intermediate result is the sum of EFD, CFT, EPT and APT.

The methodology proceeds from block 120 to decision block 124 where it determines whether an electrode having an A-nose configuration can be employed to weld joint 30. If an electrode having an A-nose configuration can not be employed to weld joint 30, the methodology proceeds to block 128 where the A-nose flag1 is set. Those skilled in the art will readily know from the thicknesses of sheet metal members 32a and 32b whether an electrode of a certain configuration, such as an A-nose configuration, can be employed to weld joint 30. The methodology then proceeds to decision block 132.

Returning to decision block 124, if an electrode having an A-nose configuration can be employed to weld joint 30, the methodology proceeds to decision block 132 where the methodology determines whether an electrode having a B-nose configuration can be employed to weld joint 30. If an electrode having a B-nose configuration can not be employed to weld joint 30, the methodology proceeds to block 136 where the B-nose flag1 is set. The methodology then proceeds to decision block 140.

Returning to decision block 132, if an electrode having a B-nose configuration can be employed to weld joint 30, the methodology proceeds to decision block 140 where the methodology determines whether an electrode having an E-nose configuration can be employed to weld joint 30. If an electrode having an E-nose configuration can not be employed to weld joint 30, the methodology proceeds to block 144 where the E-nose flag1 is set. The methodology then proceeds to decision block 148.

Returning to decision block 140, if an electrode having an E-nose configuration can be employed to weld joint 30, the methodology proceeds to decision block 148 where the methodology determines whether the face growth of the first and second electrodes is greater than zero for any tip geometry. If the face growth is not greater than zero for any tip geometry, the methodology proceeds to decision block 152 where it determines if the A-nose flag1 has been set. If A-nose flag1 has not been set, the methodology proceeds to block 156 where an additive term, XADD(A1), is calculated via a series of trigonomic relationships. The additive term represents the amount to be added to the flange to prevent the sides of the electrodes from contacting the sheet metal members. The additive term is based on corrected or uncorrected electrode dimensions, CLEAR1, RADIUS1 and ANGLE1 for an electrode with A-nose geometry, as well as the shank diameter and the electrode face growth (EFG). The methodology next proceeds to decision block 160 where the methodology determines whether ANGLE1 is greater than the calculated tip angle. If ANGLE1 is not greater than the tip angle, the methodology proceeds to block 164 where the calculated minimum flange length for an electrode with A-nose geometry (FLANGE1A) is set equal to the sum of ED and RESULT1. The methodology then proceeds to decision block 180. Returning to decision block 160, if ANGLE1 is greater than the tip angle, the methodology proceeds to decision block 168.

In decision block 168, the methodology compares XADD (A1) to ED. If XADD(A1) is less than ED, the methodology proceeds to block 164. If XADD(A1) is not less than ED, the methodology proceeds to block 172 where FLANGE1A is set equal to the sum of XADD(A1) and RESULT1. The methodology then proceeds to decision block 180.

Returning to decision block 152, if the A-nose flag1 is set, the methodology proceeds to block 176 where FLANGE1A is set to "invalid", indicating that an electrode with an A-nose geometry should not be used to weld joint 30. The methodology then proceeds to decision block 180.

In decision block 180, the methodology determines if the B-nose flag1 has been set. If B-nose flag1 has not been set, the methodology proceeds to block 184 where an additive term, XADD(B1), is calculated via a series of trigonomic relationships. The additive term represents the amount to be added to the flange to prevent the sides of the electrodes from contacting the sheet metal members. The additive term is based on corrected or uncorrected electrode dimensions, CLEAR1, RADIUS1 and ANGLE1 for an electrode with B-nose geometry, as well as the shank diameter and the electrode face growth (EFG).

The methodology next proceeds to decision block 188 where the methodology determines whether ANGLE1 is greater than the calculated tip angle. If ANGLE1 is not greater than the tip angle, the methodology proceeds to block 192 where the calculated minimum flange length for an electrode with B-nose geometry (FLANGE1B) is set equal to the sum of ED and RESULT1. The methodology then proceeds to decision block 208. Returning to decision block 188, if ANGLE1 is greater than the tip angle, the methodology proceeds to decision block 196.

In decision block 196, the methodology compares XADD (B1) to ED. If XADD(B1) is less than ED, the methodology proceeds to block 192. If XADD(B1) is not less than ED, the methodology proceeds to block 200 where FLANGE1B is set equal to the sum of XADD(B1) and RESULT1. The methodology then proceeds to decision block 208.

Returning to decision block 180, if the B-nose flag1 is set, the methodology proceeds to block 204 where FLANGE1B is set to "invalid", indicating that an electrode with B-nose geometry should not be used to weld joint 30. The methodology then proceeds to decision block 208.

In decision block 208, the methodology determines if the E-nose flag1 has been set. If E-nose flag1 has not been set, the methodology proceeds to block 212 where an additive term, XADD(E1), is calculated via a series of trigonomic relationships. The additive term represents the amount to be added to the flange to prevent the sides of the electrodes from contacting the sheet metal members. The additive term is based on corrected or uncorrected electrode dimensions, CLEAR1, RADIUS1 and ANGLE1 for an electrode with E-nose geometry, as well as the shank diameter and the electrode face growth (EFG).

The methodology next proceeds to decision block 216 where the methodology determines whether ANGLE1 is greater than the calculated tip angle. If ANGLE1 is not greater than the tip angle, the methodology proceeds to block 220 where the calculated minimum flange length for an electrode with E-nose geometry (FLANGE1E) is set equal to the sum of ED and RESULT1. The methodology then proceeds to block 280. Returning to decision block 216, if ANGLE1 is greater than the tip angle, the methodology proceeds to decision block 224.

In decision block 224, the methodology compares XADD (E1) to ED. If XADD(E1) is less than ED, the methodology proceeds to block 220. If XADD(E1) is not less than ED, the methodology proceeds to block 228 where FLANGE1E is set equal to the sum of XADD(E1) and RESULT1. The methodology then proceeds to block 280.

Returning to decision block 208, if the E-nose flag1 is set, the methodology proceeds to block 232 where FLANGE1E is set to "invalid", indicating that an electrode with E-nose geometry should not be used to weld joint 30. The methodology then proceeds to block 280.

Returning to decision block 148, if face growth is greater than zero, the methodology proceeds to decision block 240 where the methodology determines if the face growth for an electrode with A-nose geometry (FGA) is greater than zero. If FGA is greater than zero, the methodology proceeds to block 244 where it calculates corrected tip dimensions based on A-nose geometry and EFG. The methodology then proceeds to decision block 248. Referring back to decision block 240, if FGA is not greater than zero, the methodology proceeds to decision block 248.

In decision block 248 the methodology determines if the face growth for an electrode with B-nose geometry (FGB) is greater than zero. If FGB is greater than zero, the methodology proceeds to block 252 where it calculates corrected tip dimensions based on B-nose geometry and EFG. The methodology then proceeds to decision block 256. Referring back to decision block 248, if FGA is not greater than zero, the methodology proceeds to decision block 256.

In decision block 256 the methodology determines if the face growth for an electrode with E-nose geometry (FGE) is greater than zero. If FGE is greater than zero, the methodology proceeds to block 260 where it calculates corrected tip dimensions based on E-nose geometry and EFG. The methodology then proceeds to decision block 152. Referring back to decision block 256, if FGA is not greater than zero, the methodology proceeds to decision block 152.

Returning to block 280, the methodology calculates a second intermediate result (RESULT2). The second intermediate result is the sum of EFD, CFT, EPT and APT. The methodology then proceeds to decision block 284.

In decision block 284 the methodology determines whether an electrode having an A-nose configuration can be employed to weld joint 30. If an electrode having an A-nose configuration can not be employed to weld joint 30, the methodology proceeds to block 288 where the A-nose flag2 is set. The methodology then proceeds to decision block 292.

Returning to decision block 284, if an electrode having an A-nose configuration can be employed to weld joint 30, the methodology proceeds to decision block 292 where the methodology determines whether an electrode having a B-nose configuration can be employed to weld joint 30. If an electrode having a B-nose configuration can be employed to weld joint 30, the methodology proceeds to block 296 where the B-nose flag2 is set. The methodology then proceeds to decision block 300.

Returning to decision block 292, if an electrode having a B-nose configuration can be employed to weld joint 30, the methodology proceeds to decision block 300 where the methodology determines whether an electrode having an E-nose configuration can be employed to weld joint 30. If an electrode having an E-nose configuration can not be employed to weld joint 30, the methodology proceeds to block 304 where the E-nose flag2 is set. The methodology then proceeds to decision block 308.

Returning to decision block 300, if an electrode having an E-nose configuration can be employed to weld joint 30, the methodology proceeds to decision block 308 where the methodology determines whether the face growth of the first and second electrodes is greater than zero for any tip geometry. If the face growth is greater than zero for any tip geometry, the methodology proceeds to decision block 312 where the methodology determines if the face growth for an electrode with A-nose geometry (FGA) is greater than zero. If FGA is greater than zero, the methodology proceeds to block 316 where it calculates corrected tip dimensions based on A-nose geometry and EFG. The methodology then proceeds to decision block 320. Referring back to decision block 312, if FGA is not greater than zero, the methodology proceeds to decision block 320.

In decision block 320 the methodology determines if the face growth for an electrode with B-nose geometry (FGB) is greater than zero. If FGB is greater than zero, the methodology proceeds to block 324 where it calculates corrected tip dimensions based on B-nose geometry and EFG. The methodology then proceeds to decision block 328. Referring back to decision block 320, if FGA is not greater than zero, the methodology proceeds to decision block 328.

In decision block 328 the methodology determines if the face growth for an electrode with E-nose geometry (FGE) is greater than zero. If FGE is greater than zero, the methodology proceeds to block 332 where it calculates corrected tip dimensions based on E-nose geometry and EFG. The methodology then proceeds to decision block 336. Referring back to decision block 328, if FGA is not greater than zero, the methodology proceeds to decision block 336.

Returning to decision block 308, if the face growth is not greater than zero for any tip geometry, the methodology proceeds to decision block 336 where it determines if the A-nose flag2 has been set. If A-nose flag2 has not been set, the methodology proceeds to block 340 where an additive term, XADD(A2), is calculated via a series of trigonomic relationships. The additive term represents the amount to be added to the flange to prevent the sides of the electrodes from contacting the sheet metal members. The additive term is based on corrected or uncorrected electrode dimensions, CLEAR2, RADIUS2 and ANGLE2 for an electrode with A-nose geometry, as well as the shank diameter and the electrode face growth (EFG).

The methodology next proceeds to decision block 344 where the methodology determines whether ANGLE2 is greater than the calculated tip angle. If ANGLE2 is not greater than the tip angle, the methodology proceeds to block 348 where the calculated minimum flange length for an electrode with A-nose geometry (FLANGE2A) is set equal to the sum of ED and RESULT2. The methodology then proceeds to decision block 364. Returning to decision block 344, if ANGLE2 is greater than the tip angle, the methodology proceeds to decision block 352.

In decision block 352, the methodology compares XADD (A2) to ED. If XADD(A2) is less than ED, the methodology proceeds to block 348. If XADD(A2) is not less than ED, the methodology proceeds to block 356 where FLANGE2A is set equal to the sum of XADD(A2) and RESULT2. The methodology then proceeds to decision block 364.

Returning to decision block 336, if the A-nose flag2 is set, the methodology proceeds to block 360 where FLANGE2A is set to "invalid", indicating that an electrode with an A-nose geometry should not be used to weld joint 30. The methodology then proceeds to decision block 364.

In decision block 364, the methodology determines if the B-nose flag2 has been set. If B-nose flag2 has not been set, the methodology proceeds to block 368 where an additive term, XADD(B2), is calculated via a series of trigonomic relationships. The additive term represents the amount to be added to the flange to prevent the sides of the electrodes from contacting the sheet metal members. The additive term is based on corrected or uncorrected electrode dimensions, CLEAR2, RADIUS2 and ANGLE2 for an electrode with A-nose geometry, as well as the shank diameter and the electrode face growth (EFG).The methodology next proceeds to decision block 372 where the methodology determines whether ANGLE2 is greater than the calculated tip angle. If ANGLE2 is not greater than the tip angle, the methodology proceeds to block 376 where the calculated minimum flange length for an electrode with B-nose geometry (FLANGE2B) is set equal to the sum of ED and RESULT2. The methodology then proceeds to decision block 392. Returning to decision block 372, if ANGLE2 is greater than the tip angle, the methodology proceeds to decision block 380.

In decision block 380, the methodology compares XADD (B2) to ED. If XADD(B2) is less than ED, the methodology proceeds to block 376. If XADD(B2) is not less than ED, the methodology proceeds to block 384 where FLANGE2B is set equal to the sum of XADD(B2) and RESULT2. The methodology then proceeds to decision block 392.

Returning to decision block 364, if the B-nose flag2 is set, the methodology proceeds to block 388 where FLANGE2B is set to "invalid", indicating that an electrode with B-nose geometry should not be used to weld joint 30. The methodology then proceeds to decision block 392.

In decision block 392, the methodology determines if the E-nose flag2 has been set. If E-nose flag2 has not been set, the methodology proceeds to block 396 where an additive term, XADD(E2), is calculated via a series of trigonomic relationships. The additive term represents the amount to be added to the flange to prevent the sides of the electrodes from contacting the sheet metal members. The additive term is based on corrected or uncorrected electrode dimensions, CLEAR2, RADIUS2 and ANGLE2 for an electrode with A-nose geometry, as well as the shank diameter and the electrode face growth (EFG).

The methodology next proceeds to decision block 400 where the methodology determines whether ANGLE2 is greater than the calculated tip angle. If ANGLE2 is not greater than the tip angle, the methodology proceeds to block 404 where the calculated minimum flange length for an electrode with E-nose geometry (FLANGE2E) is set equal to the sum of ED and RESULT2. The methodology then proceeds to bubble 416 and terminates. Returning to decision block 400, if ANGLE2 is greater than the tip angle, the methodology proceeds to decision block 408.

In decision block 408, the methodology compares XADD (E2) to ED. If XADD(E2) is less than ED, the methodology proceeds to block 404. If XADD(E2) is not less than ED, the methodology proceeds to block 412 where FLANGE2E is set equal to the sum of XADD(E2) and RESULT2. The methodology then proceeds to bubble 416.

Returning to decision block 392, if the E-nose flag2 is set, the methodology proceeds to block 420 where FLANGE2E is set to "invalid", indicating that an electrode with E-nose geometry should not be used to weld joint 30. The methodology then proceeds to bubble 416.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

I claim:

1. A data processing system for determining a minimum flange length for a resistance welded joint formed by a pair of sheet metal members, the data processing system comprising:

a computer processor for processing data;

a data storage device for storing data regarding a plurality of resistance weld electrodes;

means for inputting a predetermined set of joint data representative of a joint to be welded, the set of joint data including an electrode face growth value; and processing means operable for processing data regarding the set of joint data and a set of tip data on a predetermined weld electrode, and calculating the minimum flange length based on the set of joint data and the tip data.

2. The data processing system of claim 1 wherein the electrode face growth value is employed by the processing means to determine whether to use a set of corrected tip data or a set of uncorrected tip data in calculating the minimum flange length.

3. The data processing system of claim 2, wherein the processing means is further operable for calculating a base flange length based on the set of joint data and the tip data, determining if a face of the predetermined resistance weld electrode will grow when the predetermined resistance weld electrode experiences a predetermined amount of wear, determining if the predetermined resistance weld electrode will contact one of the pair of sheet metal members when the predetermined resistance weld electrode experiences the predetermined amount of wear, calculating a term representing an amount by which the predetermined resistance weld electrode should be offset to prevent contact between the predetermined resistance weld electrode from contacting the pair of sheet metal members and adding the term to the base flange length if the predetermined resistance weld electrode will contact one of the pair of sheet metal members when the predetermined resistance weld electrode experiences the predetermined amount of wear.

4. The data processing system of claim 2, wherein the set of joint data further includes a thickness, a bend radius and a wall angle for each of the pair of sheet metal members.

5. The data processing system of claim 3, wherein the data in the storage device includes a tip angle and the processing means compares the wall angle to a tip angle for the predetermined resistance weld electrode to determine the minimum flange length.

6. The data processing system of claim 2, wherein the processing means is further operable for determining whether the predetermined resistance weld electrode can be employed to weld the joint.

7. A method for determining a minimum flange length for a resistance welded joint formed by a pair of sheet metal members, the method comprising the steps of:
   providing data regarding a predetermined resistance weld electrode;
   providing a predetermined set of joint data representative of a joint to be welded, the set of joint data including an electrode face growth value and an initial flange length;
   determining whether a set of corrected tip data is required; and
   calculating the minimum flange length based on the set of joint data and one of an uncorrected tip data and the corrected tip data.

8. The method of claim 7, wherein the set of joint data further includes a thickness, a bend radius and a wall angle for each of the pair of sheet metal members.

9. The method of claim 8, wherein the step of calculating the minimum flange length includes the steps of:
   determining a tip angle for the predetermined resistance weld electrode;
   comparing the wall angle to a tip angle for the predetermined resistance weld electrode to determine the minimum flange length.

10. The method of claim 9, further comprising the step of determining whether the predetermined resistance weld electrode can be employed to weld the joint.

11. The method of claim 7, wherein the step of calculating the minimum flange length includes the steps of:
    calculating a base flange length;
    determining if a face of the predetermined resistance weld electrode will grow when the predetermined electrode experiences a predetermined amount of wear;
    determining if the predetermined resistance weld electrode will contact one of the pair of sheet metal members when the predetermined resistance weld electrode experiences the predetermined amount of wear;
    calculating a term representing an amount by which the predetermined resistance weld electrode should be offset to prevent contact between the predetermined resistance weld electrode from contacting the pair of sheet metal members; and
    adding the term to the base flange length if the predetermined resistance weld electrode will contact one of the pair of sheet metal members when the predetermined resistance weld electrode experiences the predetermined amount of wear.

12. A method for determining a minimum flange length for a resistance welded joint formed by a pair of sheet metal members, the method comprising the steps of:
    providing data regarding a predetermined resistance weld electrode;
    providing a predetermined set of joint data representative of a joint to be welded, the set of joint data including an electrode face growth value;
    providing tip data on the predetermined resistance weld electrode; and
    calculating the minimum flange length based on the set of joint data and the tip data.

13. The method of claim 12, wherein the step of calculating the minimum flange length includes the steps of:
    calculating a base flange length;
    determining if a face of the predetermined resistance weld electrode will grow when the predetermined electrode experiences a predetermined amount of wear;
    determining if the predetermined resistance weld electrode will contact one of the pair of sheet metal members when the predetermined resistance weld electrode experiences the predetermined amount of wear;
    calculating a term representing an amount by which the predetermined resistance weld electrode should be offset to prevent contact between the predetermined resistance weld electrode from contacting the pair of sheet metal members; and
    adding the term to the base flange length if the predetermined resistance weld electrode will contact one of the pair of sheet metal members when the predetermined resistance weld electrode experiences the predetermined amount of wear.

14. The method of claim 13, wherein the set of joint data further includes a thickness, a bend radius and a wall angle for each of the pair of sheet metal members.

15. The method of claim 12, wherein the step of calculating the minimum flange length includes the steps of:
    determining a tip angle for the predetermined resistance weld electrode;
    comparing the wall angle to a tip angle for the predetermined weld electrode to determine the minimum flange length.

16. The method of claim 12, further comprising the step of determining whether the predetermined weld electrode can be employed to weld the joint.

* * * * *